United States Patent
Vassilieff et al.

(10) Patent No.: US 7,942,047 B2
(45) Date of Patent: May 17, 2011

(54) METHOD FOR DETERMINING THE LENGTH OF THE FOOTPRINT ON THE GROUND OF A TIRE OF A WHEEL OF A VEHICLE

(75) Inventors: Youri Vassilieff, Toulouse (FR); Riad Boukraa, Béziers (FR)

(73) Assignee: Continental Automotive France, Toulouse (FR)

( * ) Notice: Subject to any disclaimer, the term of this patent is extended or adjusted under 35 U.S.C. 154(b) by 101 days.

(21) Appl. No.: 12/370,916

(22) Filed: Feb. 13, 2009

(65) Prior Publication Data
US 2009/0205414 A1 Aug. 20, 2009

(30) Foreign Application Priority Data

Feb. 15, 2008 (FR) ..................... 08 00830

(51) Int. Cl.
*G01M 17/02* (2006.01)
(52) U.S. Cl. ........................................................ 73/146
(58) Field of Classification Search .................. None
See application file for complete search history.

(56) References Cited

U.S. PATENT DOCUMENTS

| | | | |
|---|---|---|---|
| 6,612,164 B1 | 9/2003 | Meins | |
| 2002/0092364 A1* | 7/2002 | Adderton et al. | 73/862.41 |
| 2003/0010107 A1* | 1/2003 | Giustino et al. | 73/146 |
| 2003/0159503 A1* | 8/2003 | Mancuso et al. | 73/146 |
| 2004/0100100 A1 | 5/2004 | Wilson | |
| 2007/0151334 A1 | 7/2007 | Serra et al. | |
| 2008/0209995 A1* | 9/2008 | Taylor et al. | 73/146 |

FOREIGN PATENT DOCUMENTS

| | | |
|---|---|---|
| DE | 199 37 078 | 2/2001 |
| JP | 2003-65871 | 3/2003 |
| WO | 01/94168 | 12/2001 |

OTHER PUBLICATIONS

French Search Report dated Jul. 11, 2009, from corresponding French application.

* cited by examiner

*Primary Examiner* — Andre J Allen
(74) *Attorney, Agent, or Firm* — Young & Thompson

(57) ABSTRACT

A method for determining, while a vehicle is traveling, the length of the footprint on the ground of a tire (7) including a metal belt, fitted to a rim (6) of a wheel of the vehicle. According to the invention, this method includes mounting a magnetic sensor (16) on the rim (6) and analyzing the signal representing the magnetic field measured by the magnetic sensor, so as to detect the variations of the magnetic field resulting from the deformations sustained by a circumferential zone of the tire (7) situated opposite the magnetic sensor (8) when, respectively, the circumferential zone enters into contact with the ground and leaves the ground.

8 Claims, 2 Drawing Sheets

Figure 1A:
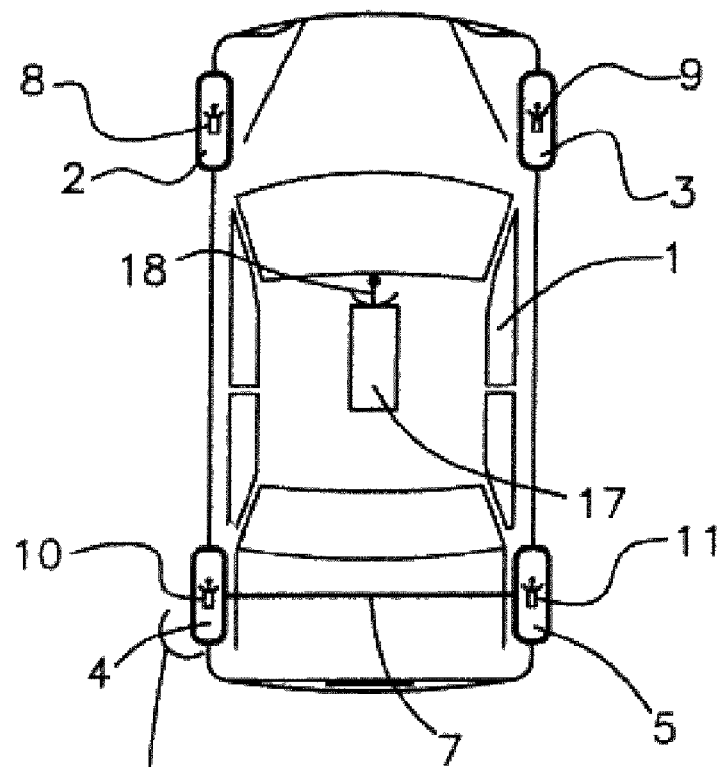

METHOD FOR DETERMINING THE LENGTH OF THE FOOTPRINT ON THE GROUND OF A TIRE OF A WHEEL OF A VEHICLE

The invention relates to a method for determining, while a vehicle is traveling, the length of the footprint on the ground of a tire of a wheel of said vehicle.

More and more motor vehicles have systems for monitoring and/or measuring parameters comprising sensors mounted on said vehicle.

As an example relating to such systems, it is possible to cite the systems for monitoring the pressure of tires comprising sensors mounted on each of the vehicle wheels, dedicated to measuring operating parameters, such as pressure, temperature etc., of the tires fitted to these wheels, and designed to inform the driver of any abnormal change in the measured parameter.

In addition to the measurement of these conventional parameters designed to provide direct information on the operating parameters of the wheels of a vehicle, it has also appeared worthwhile to measure another parameter consisting in the length of the footprint on the ground of the tires of the wheels of the vehicle.

The determination of this length of footprint of the tires on the ground indeed provides information that can be used for various purposes such as notably:
- computing the load acting on the tire,
- providing an additional parameter for managing the braking (ABS etc.) and anti-skid computers,
- determining the state of the vehicle, traveling or stopped,
- monitoring the pressure: diagnosing the abnormal deflation of a tire when there is an increase in the measured footprint' length.

Currently, the technique used to determine this footprint' length of a tire consists in fitting an accelerometer directly to the inside of the tire, for example by sticking it on, and in deducing the length of the footprint from the signal delivered by said accelerometer.

This technique has however two major disadvantages. Specifically, and in the first place, the accelerometers that are positioned in the tire are subjected to considerable stresses (impacts etc.) which cause frequent damage to said accelerometers.

In addition, such accelerometers have service lives that are limited by that of the tire since they are attached together.

The object of the present invention is to alleviate these disadvantages and its main object is to provide a method for determining the footprint' length on the ground of a tire, with an extremely high performance in terms of reliability and robustness, whose application also generates a notably smaller overall cost than that generated by the application of a current method using accelerometers.

Accordingly, the subject of the invention is a method for determining, while a vehicle is traveling, the length of the footprint on the ground of a tire comprising a metal belt, fitted to a rim of a wheel of said vehicle, said method consisting, according to the invention, in mounting a magnetic sensor on the rim and analyzing the signal representing the magnetic field measured by said magnetic sensor, so as to detect the variations of the magnetic field resulting from the deformations sustained by a circumferential zone of the tire situated opposite the magnetic sensor when, respectively, said circumferential zone enters into contact with the ground and leaves the ground.

The invention consists therefore in detecting the deformations sustained by a circumferential zone of a tire when the latter comes into contact with the ground and then leaves the ground, deformations which result in a variation of the distance separating said tire zone from the rim (a phenomenon of squashing and then releasing), and therefore in a variation of the magnetic field produced, at the rim, by the metal belt of the tire, and measured by the magnetic sensor.

The measurement of the length of the footprint on the ground of a tire therefore requires, according to the invention, a simple magnetic sensor mounted on the rim of the wheel and therefore sheltered from the impacts that said tire sustains.

As an example, such a magnetic sensor may consist, according to the invention, of a simple coil, a Hall effect sensor, or a magnetoresistive sensor (MR or GMR).

In addition, because the magnetic sensor is positioned on the wheel rim, the latter may advantageously be incorporated into an electronic module of a system for monitoring the pressure of the tires and the operating parameters of a wheel of the vehicle, so that the data originating from this magnetic sensor are transmitted with the data frames originating from the other sensors incorporated into the electronic module.

According to one advantageous embodiment, the magnetic sensor is positioned so that said magnetic sensor has an axis of maximum sensitivity extending parallel to the axis of rotation of the wheel, so that the magnetic sensor is not sensitive to the variations of the earth magnetic field when the wheel is rotating.

Furthermore, in order to increase the magnetic field produced by the metal belt of the tires, the metal belt of the tire is advantageously first magnetized in at least the circumferential zone of said tire intended to be facing the magnetic sensor. In addition, the tire is naturally magnetized during its manufacture because the elongation of the steel wires which reinforce the tire tread traps a magnetic field in the rubber. It will no longer be demagnetized (just like a hard disk).

In addition, this magnetization of the metal belt of the tire is advantageously carried out along an axis of magnetization parallel to the axis of maximum sensitivity of the magnetic sensor.

As an advantageous method of application, such a magnetization may therefore be carried out in the only circumferential zone of the tire placed facing the magnetic sensor, by means of an electromagnet, and after a tire has been mounted on a rim fitted with the magnetic sensor.

Figure 1B:
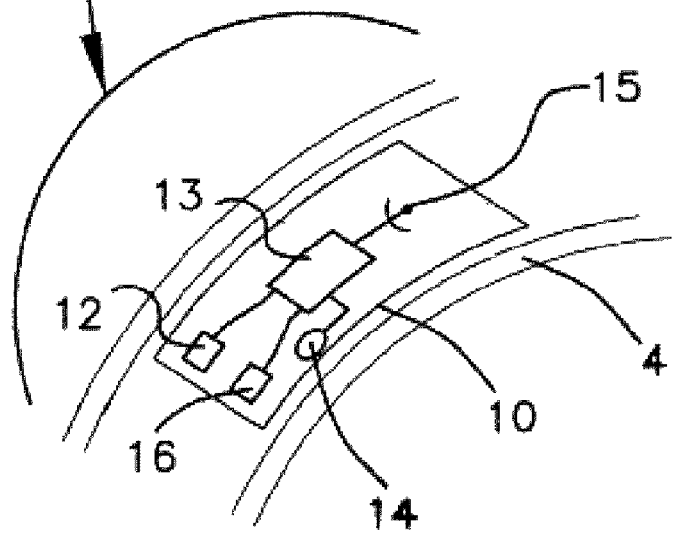
Figure 2:
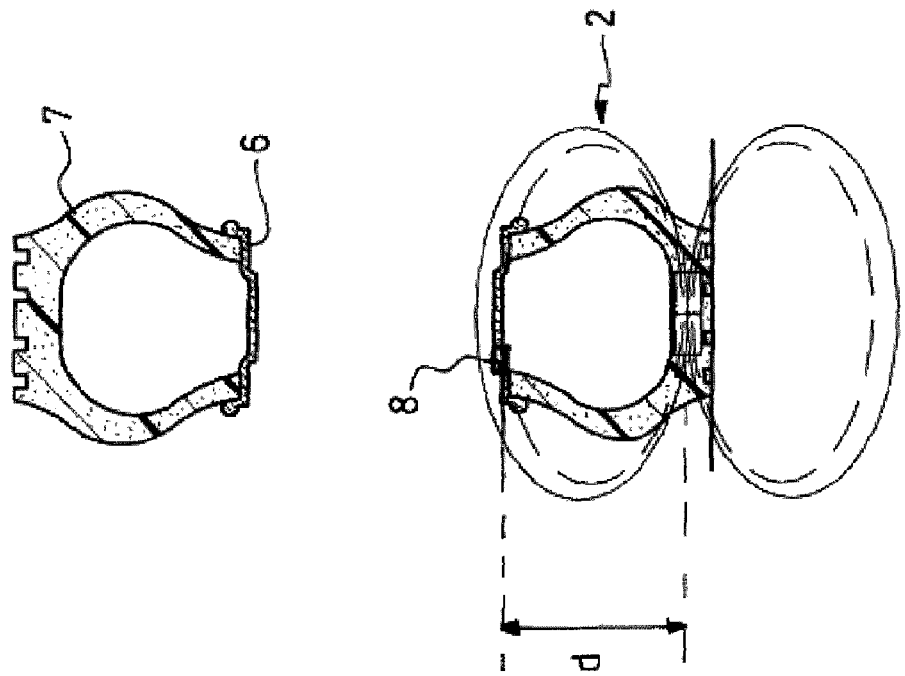
Figure 3:
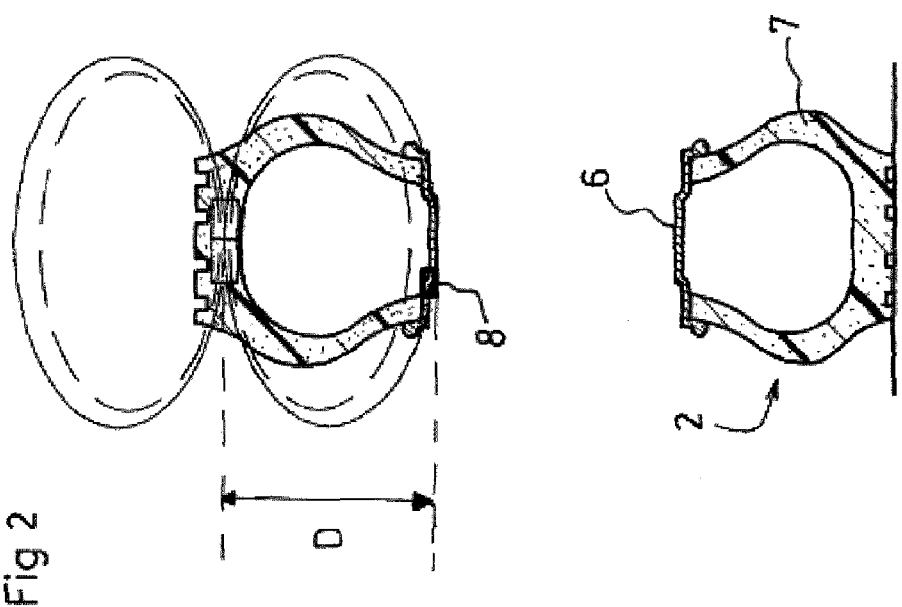

Other features, aims and advantages of the invention will emerge from the following detailed description made with reference to the appended drawings which represent a preferred embodiment as a nonlimiting example thereof. In the latter:

FIG. 1a is a top schematic view of a vehicle furnished with a tire pressure monitoring system associated with a device according to the invention for determining the length of the footprint on the ground of the tires of the wheels of said vehicle, FIG. 1b is a detailed schematic view in perspective representing a portion of a wheel of this vehicle and the electronic module fitted to the latter, FIG. 2 represents, in cross section through a vertical plane, a tire fitted with a magnetic sensor according to the invention, when said magnetic sensor (when the wheel is rotating) is at the top generatrix of said tire (that is to say with no contact with the ground).

and FIG. 3 represents, in cross section through a vertical plane, one and the same tire fitted with a magnetic sensor according to the invention when said magnetic sensor (when the wheel is rotating) is at the bottom generatrix of said tire (that is to say in contact with the ground).

FIGS. 1a and 1b represent, as an exemplary illustration of the invention, a vehicle 1 equipped with four wheels 2-5 conventionally comprising a rim 6 (FIGS. 2, 3) fitted with a tire 7, said vehicle also being fitted with a monitoring system conventionally comprising, in the first place, associated with each wheel 2-5, an electronic module 8-11 secured to the rim 6 of said wheel so as to be positioned inside the cover of the tire 7.

Each of these electronic modules 8-11 includes sensors 12 dedicated to measuring parameters, such as tire pressure and/or temperature, connected to a processor unit 13 with a microprocessor supplied electrically by means of a button battery 14, and connected to an RF transmitter connected to an antenna 15.

The monitoring system also comprises a centralized computer or central processor unit 17 situated in the vehicle 1, comprising a microprocessor and incorporating an RF receiver connected to the antenna 18 for receiving the signals transmitted by each of the four electronic modules 8-11.

Usually, such a monitoring system and notably its central processor unit 17 are designed so as to inform the driver of any abnormal change in the parameters measured by the sensors 12 associated with the wheels 2-5.

Associated with this monitoring system and forming an integral part of the latter, the device according to the invention comprises, incorporated into each electronic module 8-11, a magnetic sensor 16 suitable for making it possible to determine, when the vehicle 1 is traveling, the length of the footprint on the ground of the tire 7 fitted with said electronic module.

Accordingly, each magnetic sensor 16 is positioned so as to have an axis of maximum sensitivity extending parallel to the axis of rotation of the wheel 2-5, and designed in order to detect the variations of the magnetic field produced by the metal belt of the tire 7, said variations resulting from the deformations that are sustained by a circumferential zone of said tire situated opposite said magnetic sensor when, respectively, said circumferential zone comes into contact with the ground and then leaves the ground.

Specifically, as shown in FIGS. 2 and 3:
in the absence of contact with the ground of the circumferential zone of the tire 7 opposite which the electronic module 8 is positioned mounted on the rim 6, and hence the magnetic sensor 16 incorporated into the latter, the distance separating said electronic module and the tread of the tire 7 is maximal and equal to D (FIG. 2),
when the circumferential zone of the tire 7 opposite which the electronic module 8 is positioned mounted on the rim 6 is in contact with the ground, the distance separating said electronic module and the tread of the tire 7 is minimal and equal to d (FIG. 3).

Therefore, when the circumferential zone of the tire 7 opposite which the electronic module 8 is positioned comes into contact with the ground, the magnetic sensor 16 measures an increase in the magnetic field as a function of the reduction of the distance (d-D).

Conversely, when the circumferential zone of the tire 7 opposite which the electronic module 8 is positioned leaves the ground, the magnetic sensor 16 measures a reduction in the magnetic field as a function of the increase in the distance (D-d).

Therefore, a detection of the variations of the magnetic field makes it possible to determine, when a vehicle 1 is traveling, the length of the footprint on the ground of a tire 7 fitted with a magnetic sensor 16 according to the invention. Specifically, by measuring the time separating two variations of magnetic field (one of them is caused by the contact with the ground of the zone (called the circumferential zone) of the tire in which the magnetic sensor is being placed, and the other is caused by the end of the contact between this zone in which the magnetic sensor is situated and the ground) and by knowing the speed of rotation of the wheel (which is a known datum of the vehicle) it is then possible to deduce therefrom the dimension of the zone of the tire in contact with the ground and therefore, amongst other things, the load of the vehicle, its traveling/stopped state, state of inflation/deflation etc.

The invention therefore makes it possible to detect the variations of the magnetic field resulting from the deformations that are sustained by the circumferential zone of the tire (7) situated opposite the magnetic sensor (16) when, respectively, said circumferential zone comes into contact with the ground and leaves the ground.

Furthermore, in order to increase the magnetic field produced by the metal belt of the tires 7, and hence the sensitivity of the method according to the invention, the metal belt of the tire 7 is first magnetized along an axis of magnetization parallel to the axis of maximum sensitivity of the magnetic sensor 16.

As an example, this magnetization may therefore be carried out in the single circumferential zone of the tire 7 placed opposite the magnetic sensor 16, by means of an electromagnet, and after the tire 7 has been mounted on the rim 6 fitted with an electronic module 8-11.

The invention therefore makes it possible to determine, when a vehicle 1 is traveling, the length of the footprint on the ground of a tire 7 fitted to a rim 6 of a wheel 2-5 of said vehicle, by means of a simple magnetic sensor 16 incorporated into an electronic module 8-11 of a system for monitoring the operating parameters of the wheels of said vehicle.

The invention claimed is:

1. A method for determining, while a vehicle (1) is traveling, the length of the footprint on the ground of a tire (7) comprising a metal belt, fitted to a rim (6) of a wheel (2-5) of said vehicle, a magnetic sensor (16) on the rim (6) and said method comprising of step of:
analyzing the signal representing the magnetic field measured by said magnetic sensor, so as to detect the variations of the magnetic field resulting from the deformations sustained by a circumferential zone of the tire (7) situated opposite the magnetic sensor (16);
analyzing the signal representative of the magnetic field measured by said magnetic sensor, when, respectively, said circumferential zone enters into contact with the ground and leaves the ground in order to determine the footprint on the ground of the tire, including i) making a determination of the lapse of time between the moment when the circumferential zone of the tire touches the ground and the moment when the tire leaves the ground, and ii) making a determination of footprint of the tire contact zone with the ground during this determined lapse of time, taking into account the known wheel speed rotation.

2. The determination method as claimed in claim 1, characterized in that the magnetic sensor (16) is positioned so that said magnetic sensor has an axis of maximum sensitivity extending parallel to the axis of rotation of the wheel (2-5).

3. The determination method as claimed in claim 1, characterized in that the metal belt of the tire (7) is first magnetized in at least the circumferential zone of said tire intended to be facing the magnetic sensor (16).

4. The determination method as claimed in claim 3 taken together, characterized in that the metal belt of the tire (7) is magnetized along an axis of magnetization parallel to the axis of maximum sensitivity of the magnetic sensor (16).

5. The determination method as claimed in claim 3, characterized in that the metal belt of the tire (7) is first magnetized in the only circumferential zone of said tire placed facing the magnetic sensor (16), by means of an electromagnet, and after the tire (7) has been mounted on a rim (6) fitted with the magnetic sensor (16).

6. The determination method as claimed in claim 1, characterized in that the magnetic sensor (16) is incorporated into an electronic module (8-11) of a system for monitoring the operating parameters of a wheel (2-5) of the vehicle (1).

7. A method for determining, while a vehicle (1) is traveling, the length of the footprint on the ground of a tire (7) comprising a metal belt, fitted to a rim (6) of a wheel (2-5) of said vehicle, a magnetic sensor (16) on the rim (6) and said method comprising of step of:
  analyzing a signal representing a magnetic field measured by said magnetic sensor, so as to detect the variations of the magnetic field resulting from deformations sustained by a circumferential zone of the tire (7) situated opposite the magnetic sensor (16);
  monitoring a speed rotation of the wheel; and
  by analyzing the signal representative of the magnetic field measured by said magnetic sensor, i) making a determination of the lapse of time between a moment when the circumferential zone of the tire touches the ground and another following moment when the tire leaves the ground, and ii) making a determination of a length of the footprint of a contact zone of the tire with the ground during this determined lapse of time, taking into account the monitored speed rotation of the wheel.

8. A method for determining, while a vehicle (1) is traveling, the length of the footprint on the ground of a tire (7) comprising a metal belt, fitted to a rim (6) of a wheel (2-5) of said vehicle, a magnetic sensor (16) on the rim (6) and said method comprising of step of:
  a first step of measuring, with the magnetic sensor (16), as a circumferential zone of the tire (7) comes into contact with the ground, an increase in the magnetic field as a function of the reduction of distance;
  a second step of measuring, with the magnetic sensor (16), as the circumferential zone of the tire (7) ends contact with the ground and leaves the ground, a reduction in the magnetic field as a function of the increase in the distance;
  measuring a time separating i) said measurement of the increase in the magnetic field resulting from the tire coming into contact with the ground and ii) said measurement of the reduction in the magnetic field resulting from the tire ending contact with the ground and leaving the ground;
  monitoring a speed rotation of the wheel; and
  determining, a length of the footprint on the ground of a tire, based on i) the monitored speed rotation of the wheel and ii) the measured time separating the tire coming into contact with the ground and ending contact with the ground.

* * * * *